United States Patent
Nakagomi et al.

(10) Patent No.: US 8,149,288 B2
(45) Date of Patent: Apr. 3, 2012

(54) IMAGE CAPTURE DEVICE THAT RECORDS IMAGE ACCORDANT WITH PREDETERMINED CONDITION AND STORAGE MEDIUM THAT STORES PROGRAM

(75) Inventors: Kouichi Nakagomi, Tokorozawa (JP); Shinichi Matsui, Hamura (JP); Yutaka Onodera, Fussa (JP); Takashi Onoda, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 570 days.

(21) Appl. No.: 12/343,943

(22) Filed: Dec. 24, 2008

(65) Prior Publication Data
US 2009/0167890 A1   Jul. 2, 2009

(30) Foreign Application Priority Data
Dec. 28, 2007 (JP) ................................ 2007-338455

(51) Int. Cl.
*H04N 5/228* (2006.01)
(52) U.S. Cl. ................................ 348/222.1; 348/231.99
(58) Field of Classification Search ............. 348/208.14, 348/333.03, 352
See application file for complete search history.

(56) References Cited

U.S. PATENT DOCUMENTS

| | | | | |
|---|---|---|---|---|
| 6,803,945 | B1 * | 10/2004 | Needham | 348/207.1 |
| 7,796,161 | B2 * | 9/2010 | Oya | 348/211.6 |
| 2005/0190964 | A1 * | 9/2005 | Toyama | 382/159 |
| 2007/0003267 | A1 | 1/2007 | Shibutani | |
| 2007/0019094 | A1 * | 1/2007 | Silberstein | 348/333.01 |
| 2008/0002028 | A1 * | 1/2008 | Miyata | 348/169 |
| 2008/0088717 | A1 * | 4/2008 | Isomura | 348/231.6 |
| 2008/0218596 | A1 * | 9/2008 | Hoshino | 348/222.1 |
| 2009/0167889 | A1 * | 7/2009 | Onodera et al. | 348/222.1 |
| 2009/0237529 | A1 * | 9/2009 | Nakagomi et al. | 348/222.1 |

FOREIGN PATENT DOCUMENTS

| | | |
|---|---|---|
| JP | 6-5910 A | 1/1994 |
| JP | 6-5910 B2 | 1/1994 |
| JP | 2004-282535 | 10/2004 |
| JP | 2007-215064 A | 8/2007 |
| KR | 20070001817 A | 1/2007 |

OTHER PUBLICATIONS

Korean Office dated Mar. 29, 2010 and English translation thereof in counterpart Korean Application No. 10-2008-0130982.
Korean Office Action dated Mar. 29, 2010 and English translation thereof in counterpart Korean Application No. 10-2008-0130982.

* cited by examiner

*Primary Examiner* — Jason Chan
*Assistant Examiner* — Abdelaaziz Tissire
(74) *Attorney, Agent, or Firm* — Holtz, Holtz, Goodman & Chick, PC (57) ABSTRACT

An image capture device sets a central vicinity of a frame of a predetermined area as a focus region upon detecting a half-press operation of a shutter button in a through-the-lens image displaying, designates a central vicinity pixel region of the region as a pixel region to be tracked, and determines whether or not the designated pixel region is adequate as an object of tracking. If the pixel region is adequate, the pixel region is tracked until the shutter button is detected as pressed down fully. When a fully-press operation of the shutter button is detected, the frame of a predetermined area is displayed in a fixed manner on a display unit. Upon a detection that a change of the pixel region has occurred, or the pixel region has contacted or exceeded the frame of a predetermined area, a recording processing is started immediately by a high speed consecutive capture.

13 Claims, 7 Drawing Sheets

IMAGE CAPTURE DEVICE THAT RECORDS IMAGE ACCORDANT WITH PREDETERMINED CONDITION AND STORAGE MEDIUM THAT STORES PROGRAM

BACKGROUND OF THE INVENTION

1. Field of the Invention

The present invention relates to an image capture device and a storage medium that stores a program, and in particular, relates to an image capture device that records an image accordant with predetermined conditions, from an image to be successively captured and a storage medium that stores a program.

2. Description of the Related Art

For image capture devices, functions that automatically record images acquired by successive image captures at a moment when predetermined conditions are satisfied are devised. As one such example, in the technology recited in Unexamined Japanese Patent Application KOKAI Publication No. 2007-215064, for example, images for analysis are successively acquired prior to recording the main image, and a characteristic point image is extracted from the images for analysis. Subsequently, the image of the characteristic point is tracked, changes over time thereof are analyzed, and images of a desired image capture pattern are automatically recorded at a timing based on the analysis results.

SUMMARY OF THE INVENTION

The present invention is directed to reduce effects of changes of an image due to hand movements of a photographer, etc., and to automatically record a desired image.

An image capture device of the present invention comprises: an image capture unit; a display control unit that displays an image to be successively captured by the image capture unit and a frame of a predetermined area on a display screen; a first instruction detection unit that detects a first instruction; a designation unit that designates a first pixel region that exists inside the frame of a predetermined area of the image when a first instruction is detected by the first instruction detection unit; a second instruction detection unit that detects a recording instruction of the image to be captured after a designation by the designation unit; a tracking unit that fixes a position of the frame of a predetermined area on the display screen when a recording instruction is detected by the second instruction detection unit, and tracks the first pixel region included in the image to be successively captured; a determination unit that determines whether or not the first pixel region has contacted or exceeded the frame of a predetermined area as a result of a tracking of the tracking unit; and a first recording unit that records the image to be captured when the determination unit determines that the first pixel region has contacted or exceeded the frame of a predetermined area.

Furthermore, a program of the present invention causes a computer, comprised by the image capture device, to realize the main functions of the invention described above.

According to the present invention, effects due to changes of an image to be successively captured can be reduced and a desired image can be automatically recorded.

DETAILED DESCRIPTION OF THE PREFERRED EMBODIMENTS

Hereinafter, an image capture device 1 according to an exemplary embodiment of the present invention will be described with reference to the drawings.

A. Exterior View and Circuit Configuration

Figure 1A:
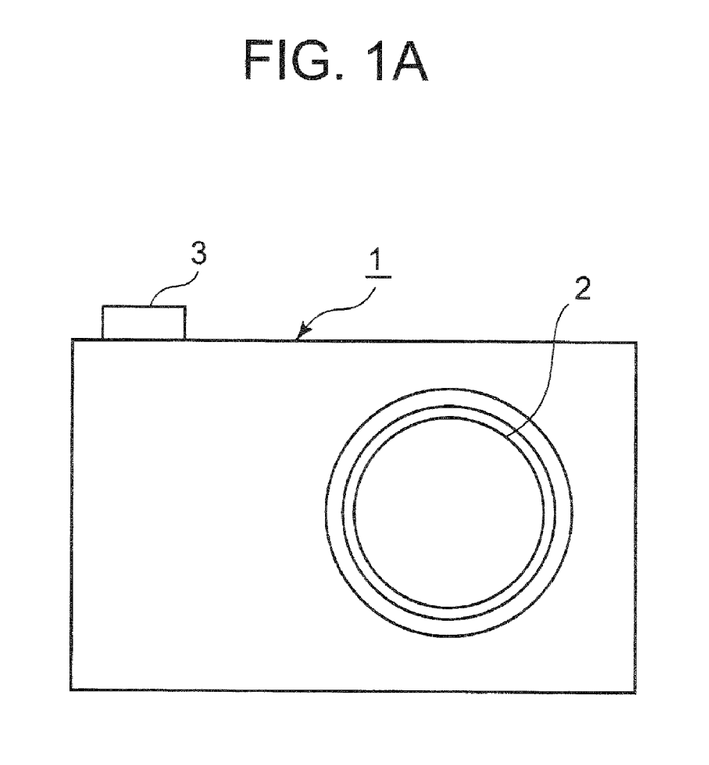
FIG. 1A and FIG. 1B are exterior views of an image capture device according to an exemplary embodiment of the present invention.
Figure 1B:
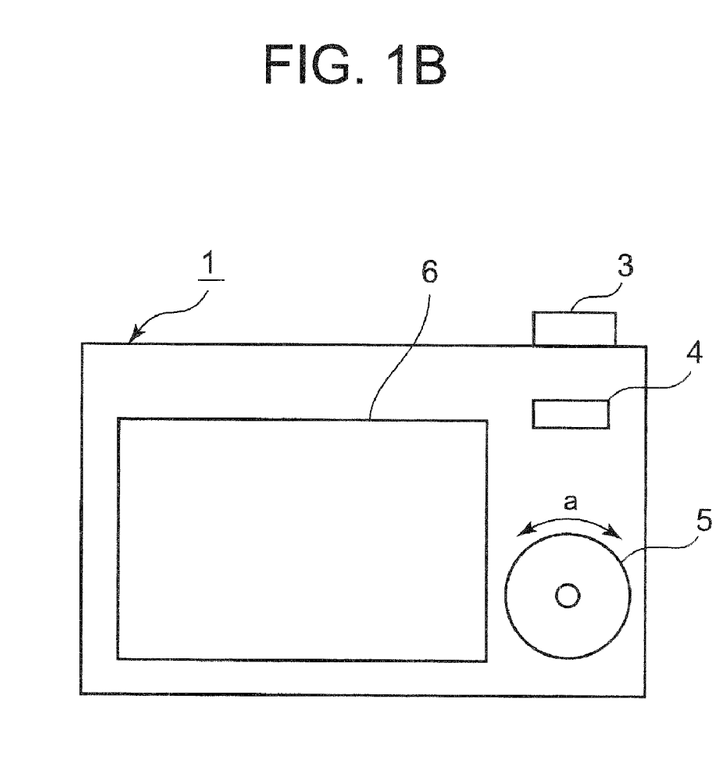

FIG. 1A is a front view illustrating an exterior of the image capture device 1 according to this exemplary embodiment; FIG. 1B is a rear view. In the image capture device 1, an image capture lens 2 is mounted on a front face, and a shutter button 3 is mounted on an upper face portion. The shutter button 3 has a so-called half shutter function capable of a half-press operation and a fully-press operation. Also, on the backside, a function key 4, a cursor key 5, and a display unit 6 are mounted. The cursor key 5 functions as a rotary switch that is rotatable in the direction "a" in FIG. 1B. The cursor key 5 is used in a frame area setting operation described below for this exemplary embodiment. The display unit 6, for example, includes an LCD (Liquid Crystal Display) having an aspect ratio of 16:9.

Figure 2:
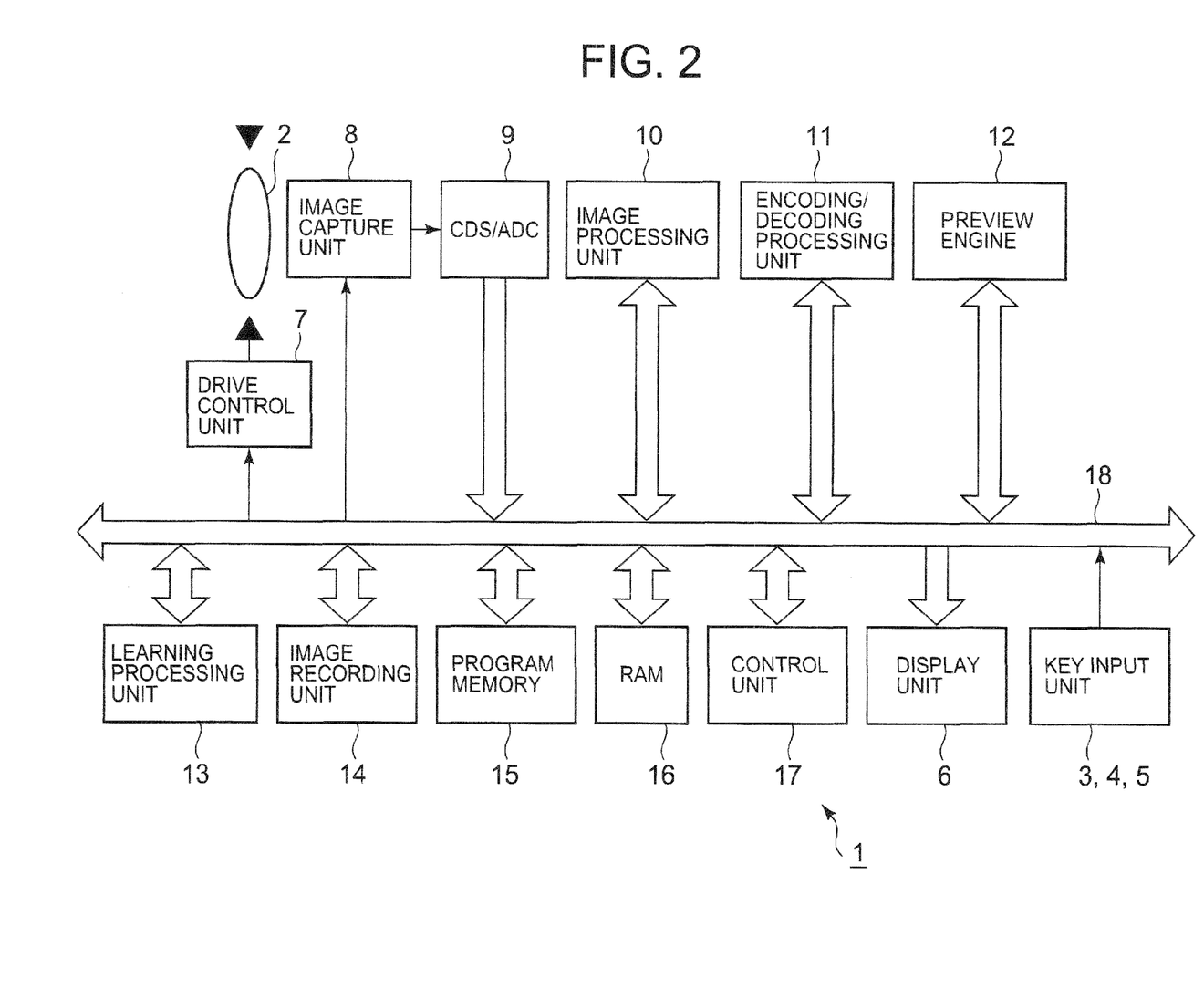
FIG. 2 is a circuit configuration diagram of the image capture device according to the exemplary embodiment of the present invention.

FIG. 2 is a block diagram illustrating a schematic configuration of the image capture device 1. The image capture device 1 includes a control unit 17 connected to each component via a bus line 18. The control unit 17 is a one-chip microcomputer that controls each component of the image capture device 1.

The image capture lens 2, in particular, is a lens unit in which an optical member is mounted.

The control unit 17, upon detecting a zoom operation by a photographer or a half-press operation of the shutter button 3 by the photographer, performs an AF (autofocus) processing and sends a control signal to a drive control unit 7 for controlling the drive control unit 7. The drive control unit 7 changes the position of the image capture lens 2 based on the control signal.

An image capture unit 8 includes an image sensor CMOS (Complementary Metal Oxide Semiconductor), etc. and is disposed on the optical axis of the image capture lens 2 described above. A unit circuit 9 is a circuit that receives the input of an analog image capture signal according to the optical image of an imaging subject output by the image capture unit 8. The unit circuit 9 includes a CDS that stores the input image capture signal, a gain control amplifier (AGC) that amplifies the image capture signal for AE (automatic exposure control) processing and the like, an A/D converter (ADC) that converts the amplified image capture signal into a digital image capture signal, etc.

The image capture signal output from the image capture unit 8 passes through the unit circuit 9 and is sent to an image processing unit 10 as a digital signal. The digital signal (image capture signal) undergoes various image processing by the image processing unit 10, and further undergoes a reduction by a preview engine 12 and is supplied to the display unit 6. Also, when the supplied digital signal (image capture signal) and a drive control signal that drives a driver built into the display unit 6 are input to the display unit 6, the display unit 6 displays an image based on the digital signal (image capture signal) on a lower layer as a through-the-lens image (live view image).

Additionally, during image recording, the image capture signal processed by the image processing unit 10 undergoes compression encoding by an encoding/decoding processing unit 11, and is filed as a predetermined file format such as a JPEG format, etc., and is recorded in an image recording unit 14. On the other hand, during image reproduction, an image file read from the image recording unit 14 is decoded by the encoding/decoding processing unit 11 and displayed on the display unit 6.

The preview engine 12, in addition to creating the through-the-lens image recited above performs necessary controls during image recording when displaying an image on the display unit 6 directly prior to recording in the image recording unit 14. A learning processing unit 13 is a circuit unit that learns an area of high likelihood for a pixel region described below.

Furthermore, a program memory 15 and a RAM (Random Access Memory) 16 are also connected to the bus line 18. The RAM 16 temporarily stores consecutively captured images. The program memory 15 stores a program that executes processing illustrated in a flowchart described below.

B. Automatic Recording Processing

Figure 3:
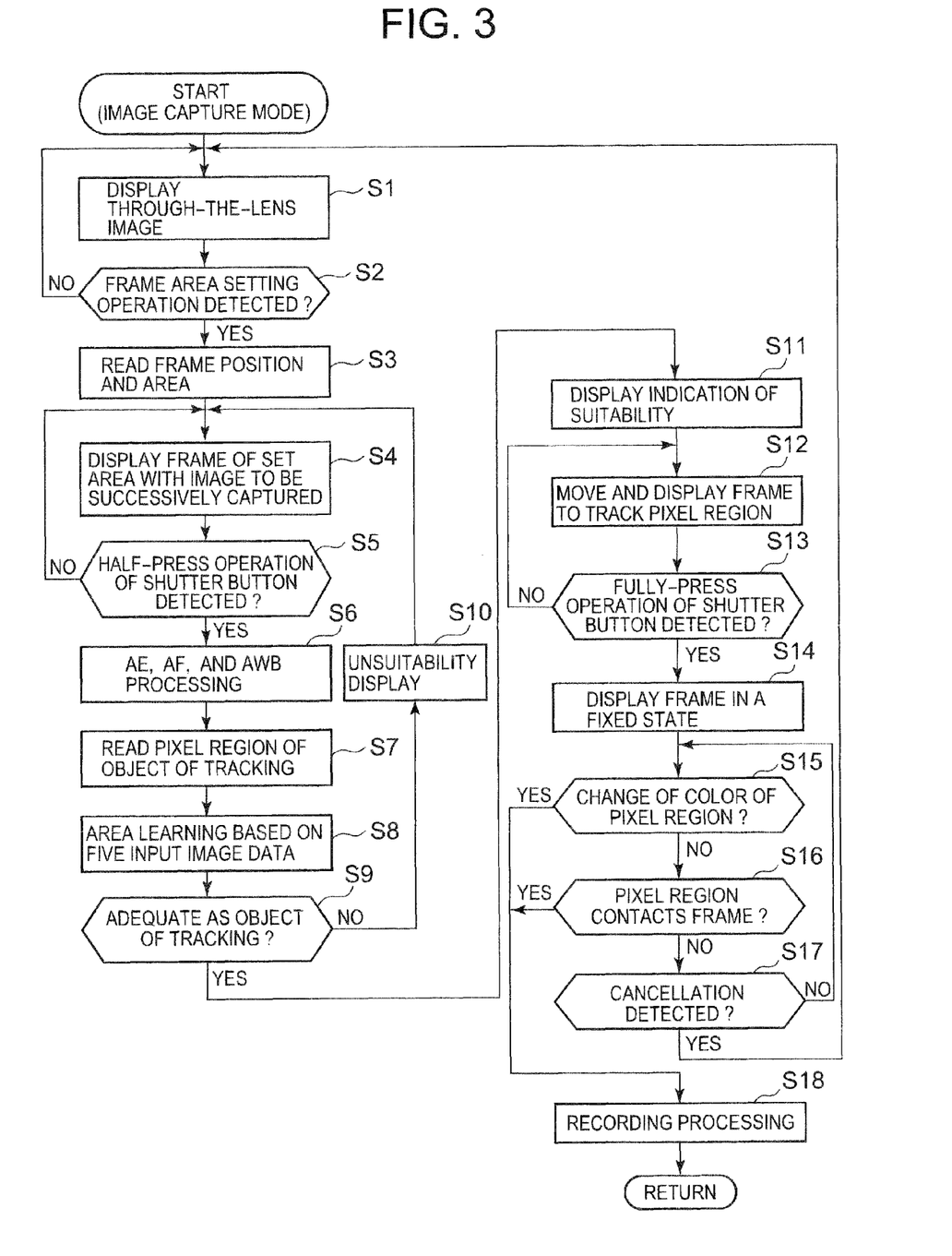
FIG. 3 is a flowchart of an automatic recording processing of the exemplary embodiment of the present invention.

Next an automatic recording processing of the image capture device 1 will be described using FIG. 3 to FIG. 5C. FIG. 3 is a flowchart illustrating processing, from image capture to recording in an image recording unit 14.

The control unit 17, upon detecting an instruction to initiate an image capture mode regarding automatic image capture processing from a predetermined operation of the function key 4 and the cursor key 5, reads and executes a program from the program memory 15 concerning the image capture processing. Also the control unit 17 causes the image capture unit 8, the unit circuit 9 the image processing unit 10, the RAM 16, the encoding/decoding processing unit 11, and the preview engine 12 to perform initial operations (start state).

Additionally the control unit 17 periodically performs conversions to digital signals by the unit circuit 9 based on images optically formed in the image capture unit 8 via the image capture lens 2. The control unit 17 changes the digital signal into image data by an image signal processing unit 10, and the resulting obtained image is displayed as a through-the-lens image on the display unit 6 as a lower layer. Also, on the upper layer, the control unit 17 displays an icon as an indication of the image capture mode with automatic recording processing and a frame of a predetermined area (step S1).

Next, when the control unit 17 displays the through-the-lens image, the control unit 17 determines whether or not an area setting operation for a frame of a predetermined area by a predetermined operation has been detected from the function key 4 and a rotational operation of the cursor key 5 (step S2). In the case where an area setting operation is not detected (step S2: No), the control unit 17 again displays the through-the-lens image. In the case where an area setting operation is detected (step S2: Yes), the control unit 17 reads the position and the set area of the frame (step S3) and displays the frame of the set area on an upper layer of the through-the-lens image (step S4).

Figure 4A:
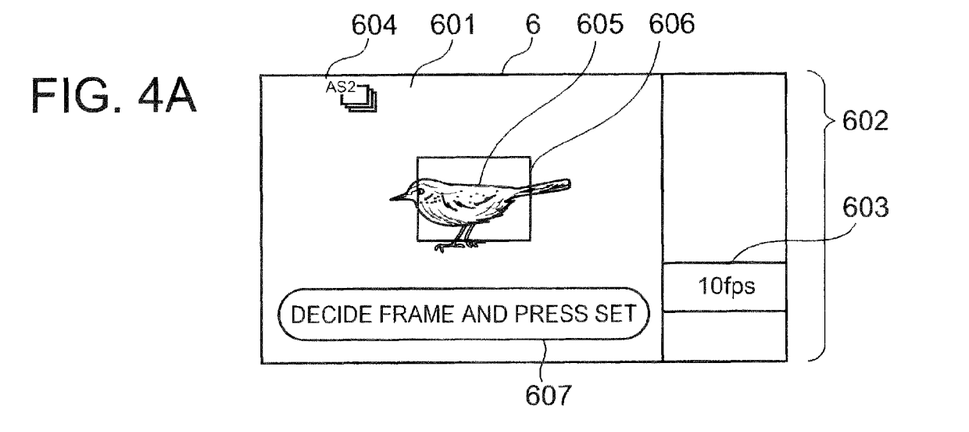
FIGS. 4A to 4C are display examples of the same exemplar embodiment.

FIG. 4A illustrates a display configuration of the display unit 6 of step S2. The display unit 6 includes a through-the-lens image display region 601, and an operation panel display region 602 that displays current image capture settings and the like. In the operation panel display region 602, an indication is shown that the image capture mode includes high speed consecutive capture; and a frame rate display region 603 that displays the frame rate, an icon 604 which indicates that the image capture mode includes automatic recording processing, an image 605 of a bird (object of photography to be tracked/recorded), a frame of a predetermined area 606, and guidance 607 for prompting the photographer to perform the frame area setting are displayed on the display unit 6.

Upon displaying FIG. 4A in step S2, the photographer, while observing the behavior of the bird displayed as the image 605, rotates the cursor key 5 in the right direction or the left direction, and adjusts the area of the frame 606. Furthermore, the photographer operates the function key 4 (this means a decision for this setting operation) and sets the area of the frame 606. Therefore, the photographer observes the behavior of an object of photography for which automatic recording is desired, and by ascertaining how much the object of photography moves, the frame 606 can be set; and therefore, the frame 606 can be set easily for objects of photography from rapid to relatively slow movements.

Upon displaying the frame 606 in step S4, the control unit 17 waits for a detection of a half-press operation of the shutter button 3 by the photographer (step S5). In the case where a predetermined amount of time passes without detecting a half-press operation of the shutter button 3, or a cancellation is detected by a predetermined operation detection (step S5: No), the flow returns to step S4. Upon detecting a half-press operation of the shutter button 3, (step S5: Yes), the control unit 17 sets a central vicinity of the frame 606 as a focus region and performs an AF (autofocus) processing, an AF (automatic exposure control) processing, and an AWB (automatic white balance) processing for the region (step S6). Then, the control unit 17 designates a pixel region of nine pixels, being three rows by three columns, of the central vicinity of the frame 606 as a pixel region to be tracked, and performs a reading processing of the pixel region (step S7).

Next, the control unit 17 performs a processing that determines whether or not the designated pixel region is adequate as an object of tracking (step S8 and S9). The details are described below, but under the control of the control unit 17, the learning processing unit 13 learns, for five subsequent successively captured image data, how much an area of high likelihood of the color space components (YUV) of the pixel region designated in step S7 diffuses. Additionally, the learning processing unit 13 learns whether or not the size of the area of the diffusion is within a predetermined threshold, whether or not the area has a convergence trend, and the like. Also, the learning processing unit 13 outputs the result to the control unit 17 (step S8). Furthermore, the control unit 17, which receives the learning result, determines from the size of the area of the diffusion whether the pixel region designated in step S7 is adequate as an object of tracking (step S9).

The control unit 17, upon determining that the designated pixel region is inadequate as an object of tracking (step S9: No), displays an indication on the display unit 6 that the designated pixel region is unsuitable as an object of tracking (step S10), and proceeds to process of step S4. On the other hand, upon determining that the designated pixel region is adequate as an object of tracking (step S9: Yes), the control unit 17 displays an indication that the designated pixel region is suitable as an object of tracking on the display unit 6 (step S11).

Figure 4B:
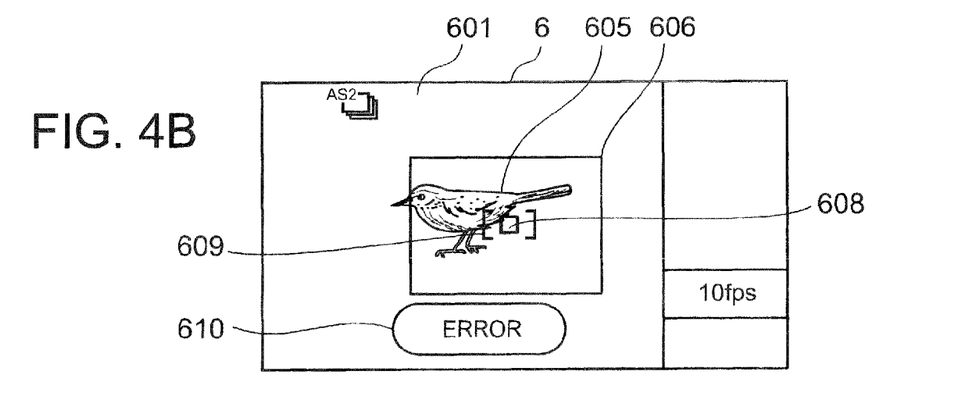

FIG. 4B illustrates a display configuration of the display unit 6 of step S10. For FIG. 4B, a description is omitted for display items having the same numerals as those of FIG. 4A.

As illustrated in FIG. 4B, an AF frame 609 that appears due to the detection of the half-press operation of the shutter button 3 in step S5 is displayed on the display unit 6; and the designated pixel region 608 is displayed on a central vicinity of the AF frame 609. Also, a guidance (Error) 610 is displayed as an indication that the designated pixel region 608 is unsuitable as an object of tracking.

For this display configuration, the AF frame 609 is outside the image 605. In other words, an image having uniform color space components (YUV), or an image unsusceptible to a determination of a focal distance exists in the central vicinity.

For the five successively captured image data for the pixel region 608 of FIG. 4B, the area of high likelihood of the color space components (YUV) of the pixel region 608 does not have a convergence trend, and therefore the control unit 17 determines that the pixel region 608 is unsuitable as an object of tracking (step S9: No).

Thus, in the case where the pixel region is unsuitable as an object of tracking (step S9: No), an indication thereof is displayed (step S10), and the flow returns to a candidate selection operation of the pixel region, so that the photographer can easily understand the indication with the through-the-lens image.

Figure 4C:
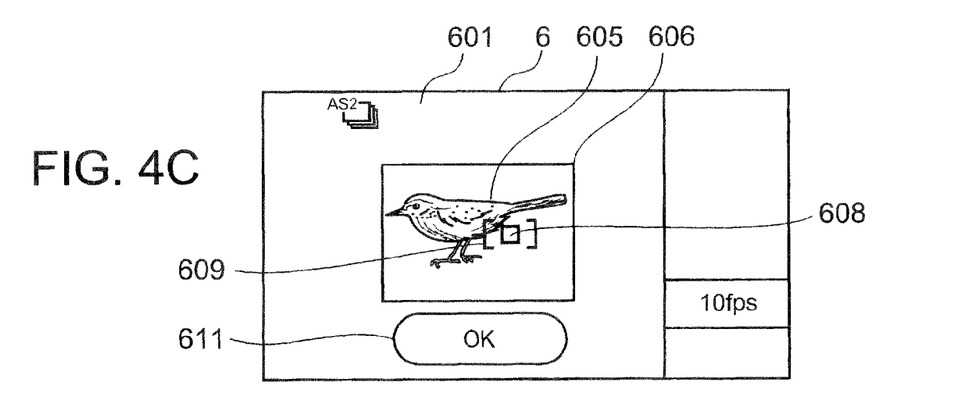

In contrast, FIG. 4C illustrates a display configuration of the display unit 6 of step S11. For FIG. 4C, a description is omitted for display items having the same numerals as those of FIG. 4A and FIG. 4B. As illustrated in FIG. 4C, the AF frame 609, the pixel region 608, and a guidance (OK) 611 as an indication that the designated pixel region is suitable as an object of tracking are displayed on the display unit 6.

In other words, for this display configuration, the AF frame 609 is superimposed on the image 605, and the pixel region 608 has been obtained in step S6 from the image 605 that has undergone AF (auto focus) processing, AE (automatic exposure control) processing and AWB (automatic white balance) processing. For the five successively captured image data of the pixel region 608 of FIG. 4C, the area of high likelihood of the color space components (YUV) of the pixel region 608 has a convergence trend, and therefore the control unit 17 determines that the pixel region 608 is suitable as an object of tracking (step S9: Yes).

Thus, in the case where the pixel region is suitable as an object of tracking (step S9: Yes), an indication thereof is displayed (step S11), and therefore the photographer can easily understand the indication with the through-the-lens image.

Also, the learning processing unit 13, for the subsequent five successively captured image data, learns how much the area of high likelihood of the color space components (YUV) of the pixel region designated in step S7 diffuses. Additionally, the learning processing unit 13 learns whether or not the size of the area of the diffusion is within a predetermined threshold, whether or not the area has a convergence trend, etc. Furthermore, the control unit 17 determines the suitability as an object of tracking according to the learning result from the learning processing unit 13. Therefore, in comparison to the case where a characteristic point image is analyzed, an object of tracking can be set much broader.

Also, the pixel region 608 of the learning is obtained from an image that has undergone AF (autofocus) processing, AE (automatic exposure control) processing, and AWB (automatic white balance) processing, and therefore image data without blow out or black out can be used; and it can be determined with higher certainty whether or not the pixel region 608 is suitable as an object of tracking.

Upon displaying the indication of suitability in step S11, the control unit 17, for the subsequent image data that is successively captured and corresponds to the through-the-lens image displayed on the display unit 6, performs processing that tracks the pixel region 608 or the area of high likelihood of the color space components (YUV) of the pixel region 608. Also, together with the tracking, the control unit 17 moves and displays the frame 606 so that the pixel region 608 is positioned in the central vicinity (step S12), and waits for a detection of a fully-press operation of the shutter button 3 by the photographer (step S13).

Thus, according to this exemplary embodiment, the area of high likelihood of the color space components (YUV) of the pixel region 608 designated as an object of tracking (a high existence probability of the pixel region 608) is tracked inside data of the next image (frame), and therefore in comparison to the case where a characteristic point image is tracked, an expected effect is an improvement of the resistance to losing sight of objects of tracking.

Additionally, until a fully-press operation of the shutter button 3, it is possible for the photographer to freely decide a composition where the object of tracking is in an area within the image being captured. Thereby, the photographer can automatically record a composition of preference that includes the object of photography.

Subsequently, in the case where a predetermined amount of time passes without a detection of a fully-press operation of the shutter button 3, or a cancellation is detected by a predetermined operation detection (step S13: No), the flow returns to step S12. Upon a detection of a fully-press operation of the shutter button 3 (step S13: Yes), the control unit 17 fixes the frame 606 on the display unit 6 (step S14).

Figure 5A:
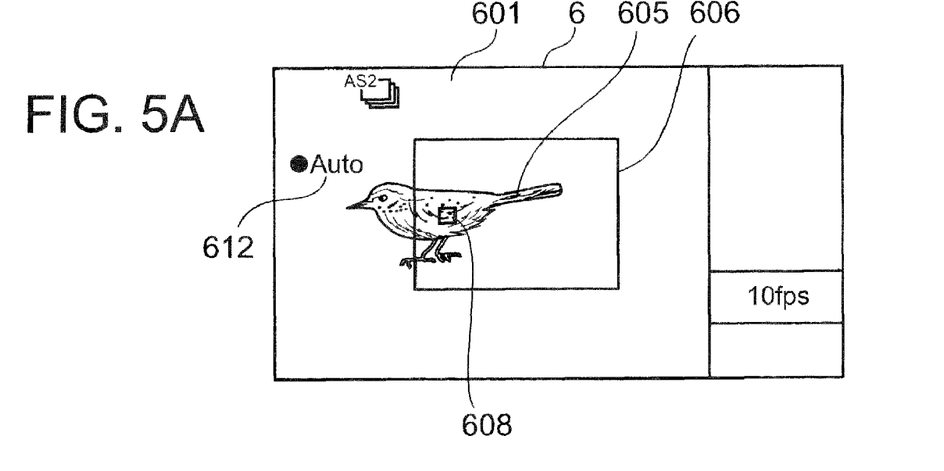
FIGS. 5A to 5C are display examples of the same exemplary embodiment.

FIG. 5A illustrates a display configuration of the display unit 6 of step S14. A description is omitted for display items having the same numerals as those of FIG. 4A to FIG. 4C. Due to the detection of the fully-press operation of the shutter button 3 in step S13, an icon 612 is displayed on the display unit 6 to notify that automatic recording is waiting to start. Also, the frame 606 at the time of step S12 is moved and displayed while tracking the movement of the pixel region 608 such that the pixel region 608 is brought to the central vicinity, but upon the detection of the fully-press operation of the shutter button 3, the frame 606 is fixed at a position at the time.

Upon detecting a fully-press operation of the shutter button 3 in step S13 the control unit 17 determines whether or not the pixel region 608 has abruptly changed for the image data captured next (whether or not the area of high likelihood for the pixel region 608 has abruptly changed) (step S15). This is, for example, to determine whether or not a change has occurred in the pixel region 608 or an area of pixel regions around the pixel region 608 due to the image 605 (bird (object of photography to be tracked/recorded)) suddenly flapping its wings or the like. In the case where the control unit 17 detects an abrupt change (step S15: Yes), the control unit 17 immediately starts a recording processing by high speed consecutive capture (step S18), and the image capture mode returns after recording a predetermined number of frames. Thus, even when predictions of the behavior for the object of photography are difficult, it is possible to reliably track the object of photography and record a crucial moment.

Also, even in the case where the control unit 17 does not detect an abrupt change of the pixel region 608 in step S15 (step S15: No), when the control unit 17 detects that the it pixel region 608 has contacted or exceeded the frame 606 (step S16: Yes), the control unit 17 immediately starts a recording processing by high speed consecutive capture (step S18); and the image capture mode returns after recording a predetermined number of frames.

Figure 5B:
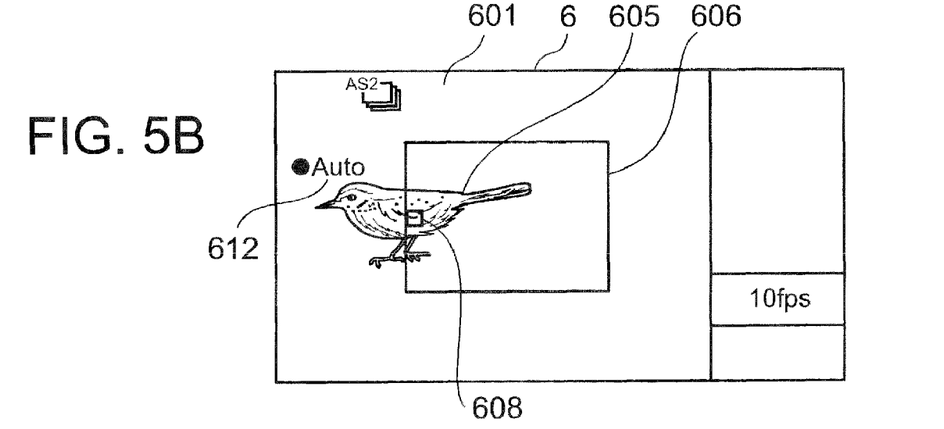
Figure 5C:
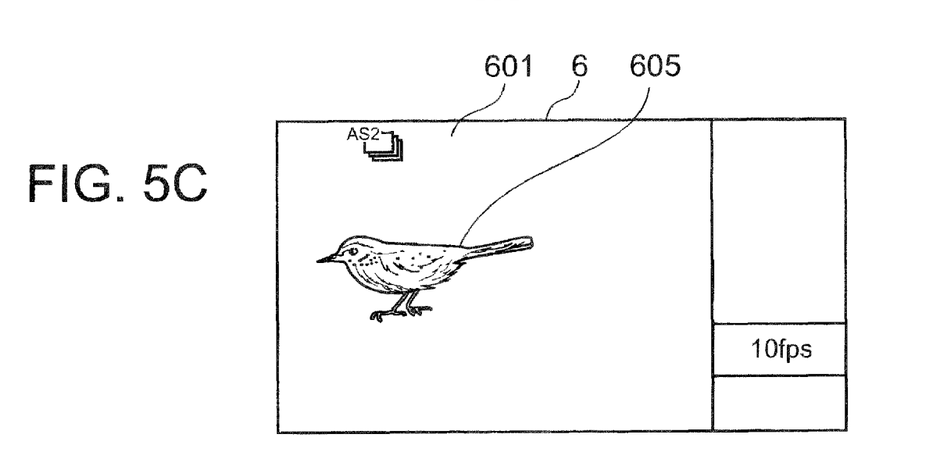

FIG. 5B and FIG. 5C illustrate display configurations of the display unit 6 of step S16 and step S18. For FIG. 5B and FIG. 5C, a description is omitted for display items having the same numerals as those of FIG. 5A. In FIG. 5B, the pixel region 608 contacts the left boundary line of the frame 606 fixed in step S14. Therefore, the control unit 17 determines this state to be a photograph opportunity, and proceeds to recording processing. When the control unit 17 starts the recording processing, a display configuration such as that in FIG. 5C is activated. Thus, if the pixel region 608, that is, the image (object of photography to be tracked/recorded) 605 moves in any preset area, it can be reliably recorded; and therefore, an image more accordant with a composition of preference of the photographer can be recorded.

Also, in the case where the control unit 17 does not detect an abrupt change of the pixel region 608 in step S15 (step S15: No) and does not detect that the pixel region 608 has contacted or exceeded the frame 606 (step S16: No), the control unit 17 determines whether or not a predetermined amount of time has passed, or the existence or absence of a detection of a cancellation by a predetermined operation detection (step S17). Additionally, in the case where the control unit 17 detects neither a passage of the predetermined amount of time nor a cancellation by the predetermined operation detection (step S17: No), the flow returns to step S15. In the case where the control unit 17 detects a passage of the predetermined amount of time or a cancellation by the predetermined operation detection (step S17: Yes), the flow returns to step S1.

Thus, according to this exemplary embodiment, with the feel of operating a conventional image capture device and only by fully-press operations and half-press operations of the shutter button, an object of tracking can be automatically recorded with a composition of preference; and therefore an image capture device of convenient operation capable of automatic recording can be provided.

C. Learning Processing

Next, the processing of the learning processing unit 13 executed in step S8 of FIG. 3 will be described.

Figure 6A:
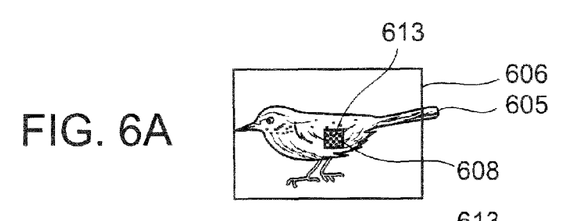
FIGS. 6A to 6J illustrate an overview of processing by a learning processing unit.

FIG. 6A illustrates the image (object of photography to be tracked/recorded) 605 displayed in the frame 606, and in particular, illustrates the image input in step S7. For the same figure, a time series filtering system called a particle filter is used for each YUV color space component for the pixel region 608.

Note that the basic theory of particle filter is known by way of the Information Processing Society of Japan research report "Introduction of Particle Filter and Its Implementation," Takekazu Kato, Wakayama University (CVIM January 2007 Transactions Program Presentation of Jan. 12, 2007) and therefore the description of particle filter is omitted.

To summarize, a particle filter estimates multiple next-states that may occur from the current state of an object as multiple (several hundred or several thousand) particles. Also, it is a filtering system that performs tracking of the object while predicting weighted averages as the next state based on the likelihood of all particles.

Figure 6B:
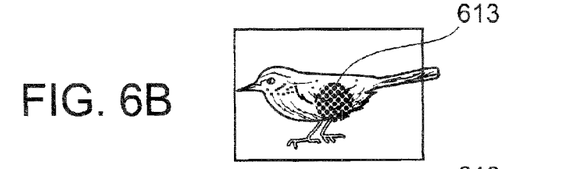
Figure 6C:
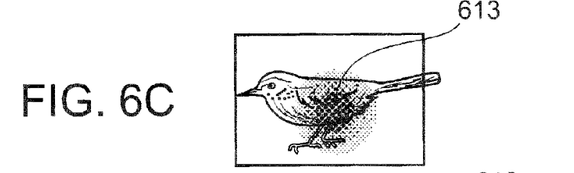

For FIG. 6A, an area 613 is a particle filter area. As a result of resampling this area, the learning processing unit 13 determines a filter area for the next state (the image to be captured next). The area 613 of FIG. 6B illustrates the filter area of the next captured image determined based on the likelihood for FIG. 6A. The area 613 of FIG. 6C illustrates the filter area of the next captured image determined by the learning processing unit 13 based on the likelihood for FIG. 6B. Here, the area 613 itself in FIG. 6C spreads, and thereby particles start to occur outside the pixels of the image 605. The particles outside of the pixels of the image 605 have lower likelihoods in comparison to the particles inside the pixels of the image 605, and therefore a difference in the likelihood density starts to occur.

Figures 6D, 6E:
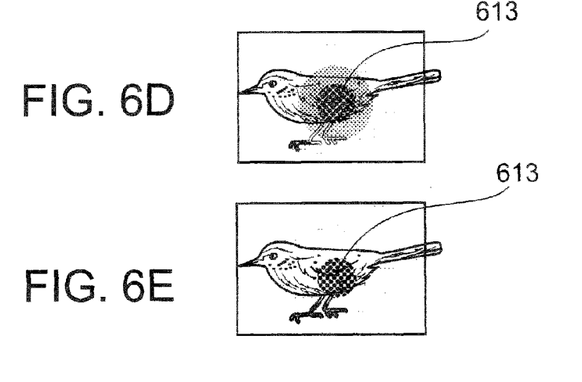

Furthermore, the area 613 of FIG. 6D illustrates the filter area of the next captured images determined by the learning processing unit 13 based on the likelihood for FIG. 6C. The area 613 itself in FIG. 6D spreads further in comparison to that of FIG. 6C, but the particles outside of the pixels of the image 605 have lower likelihoods in comparison to the particles inside the pixels of the image 605; and an area having a likelihood no less than a certain level starts to become biased around the pixel region 608.

The area 613 of FIG. 6E illustrates the filter area of the next captured image determined by the learning processing unit 13 based on the likelihood for FIG. 6D. According to the area 613 of FIG. 6E, it is obvious that finally, the area having a likelihood no less than a certain level does not spread further, and there exists a convergence trend. Therefore, the learning processing unit 13 learns that the pixel region 608 is suitable as an object of tracking.

Figure 6F:
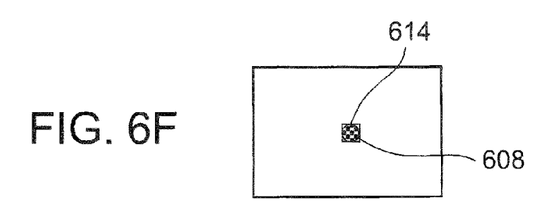
Figure 6G:
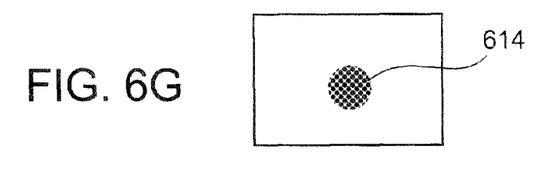
Figures 6H, 6I:
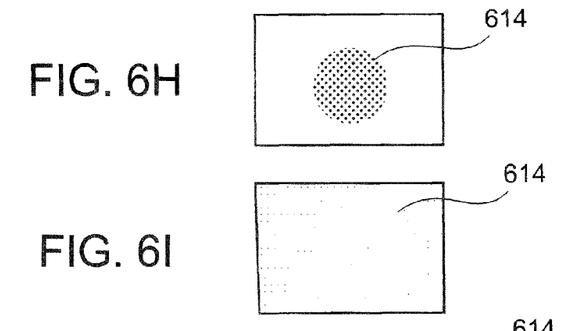

On the other hand, FIG. 6F illustrates a state where an image having a uniform YUV is captured in step S7. For FIG. 6F, the area 614 is a particle filter area. As a result of resampling this area, the learning processing unit 13 determines a filter area for the next state (the image to be captured next). The area 614 of FIG. 6G illustrates the filter area of the next captured image determined by the learning processing unit 13 based on the likelihood for FIG. 6F. The area 614 of FIG. 6H illustrates the filter area of the next captured image determined by the learning processing unit 13 based on the likelihood for FIG. 6G. Here, the area 614 itself in FIG. 6G spreads: but this is an image of uniform YUV, and therefore no difference of likelihood occurs and a uniformity of likelihood starts to spread.

Figure 6J:
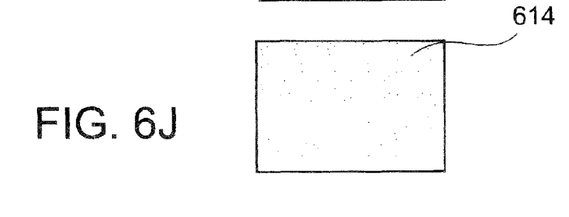

Moreover, the area 614 of FIG. 6I illustrates the filter area of the next captured image determined by the learning processing unit 13 based on the likelihood for FIG. 6H. Here also, this is an image of uniform YUV, and therefore spreading occurs with a uniformity of likelihood; and finally, even in the fifth image of FIG. 6J, the likelihood area does not converge, and has a diffusing trend. Therefore, the learning processing unit 13 learns that the pixel region 608 is unsuitable as an object of tracking. For FIGS. 6F to 6J, similar to FIG. 6A to FIG. 6E, processing of successive likelihood areas for the five image data is repeated, but this is not limited as such; and in the case where the likelihood area has a trend to spread beyond a preset area prior to performing the processing of the fifth data, the learning processing unit 13 may discontinue the learning processing partway and output an indication of unsuitability to the control unit 17.

D. Modification

Figure 7:
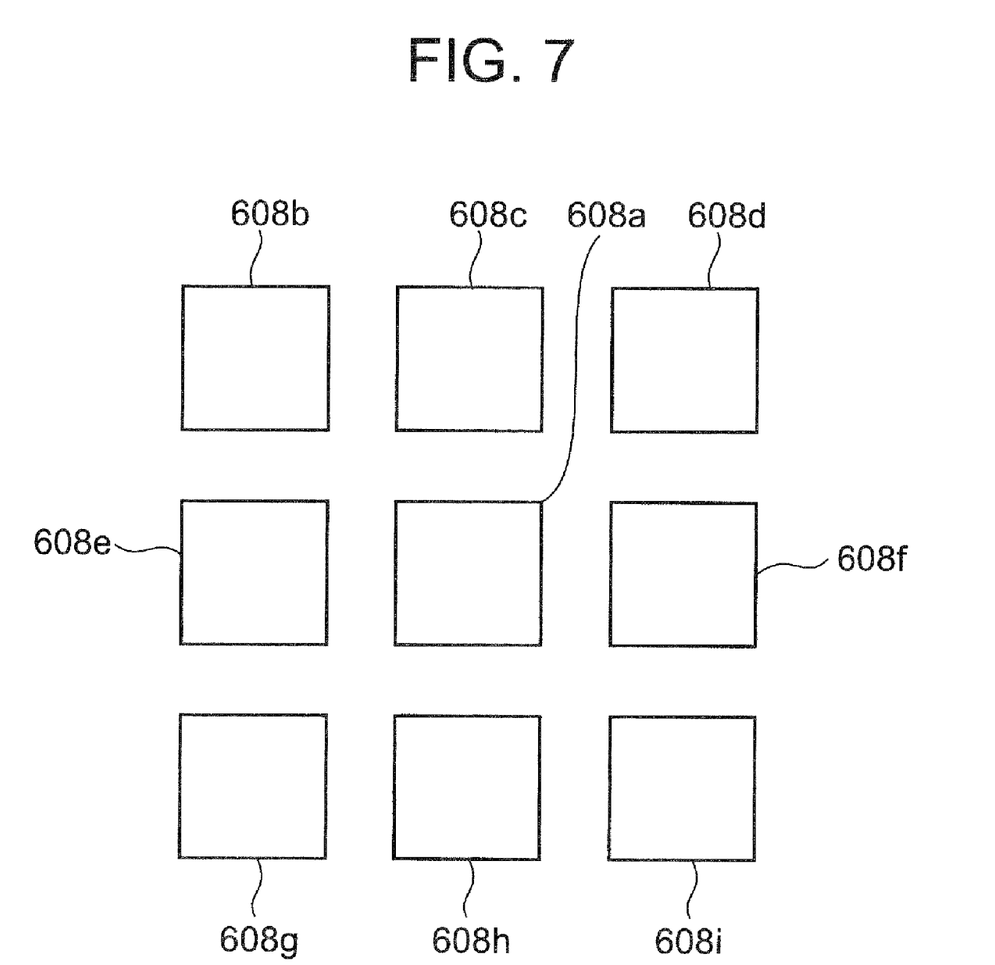
FIG. 7 illustrates an arrangement of pixel regions of a modification.

In the exemplary embodiment recited above, the description was limited to the case where the pixel region 608 is nine pixels, being three rows by three columns, but this is not limited as such. Multiple pixel regions 608 may be prepared and regularly arranged, and learning processing may be performed in parallel. FIG. 7 illustrates an arrangement of the pixel regions 608 of this modification, and in the figure, a pixel region 608a corresponds to the pixel region 608 of the exemplary embodiment recited above. With the pixel region 608a as a center, the pixel regions 608b to 608i are regularly arranged therearound. Therefore, by the use of such an arrangement configuration, suitable pixel regions can be increased, and pixels forming an object of tracking can be easily designated.

In the exemplary embodiment recited above, after the detection of a fully-press operation of the shutter button 3, the control unit 17 did not perform recording processing until detecting that the pixel region 608 changed, or contacted or exceeded the frame 606. This is not limited as such, and the control unit 17 may immediately perform recording processing after the detection of the fully-press operation of the shutter button 3. Thus, an image prior to the automatic recording processing can be recorded; and therefore, images before and after the obtained photograph opportunity can also be recorded, and images having better dramatic effects can be obtained.

Also, for the learning processing unit 13 of the exemplary embodiment recited above, the learning processing is performed for a designated pixel region using YUV color space components, but this is not limited as such: and for color space components, RGB, HSV (Hue, Saturation, Value (Brightness)), HLS (Hue, Lightness, Saturation), I1I2I3, etc. may be used.

Additionally, for the exemplary embodiment recited above, an automatic recording processing of the image capture device 1 was described. The present invention may be applied without being limited as such an equipment, method, or program that includes an image capture function.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-338455 filed on Dec. 28, 2007 and including specification, claims, drawings and summary. The disclosure of the above Japanese Patent Application is incorporated herein by reference in its entirety.

What is claimed is:

1. An image capture device comprising:
   an image capture unit;
   a display control unit that displays an image to be successively captured by the image capture unit and a frame of a predetermined area on a display screen, wherein the display control unit displays the frame of the predetermined area so as to be superimposed on the image;
   a first instruction detection unit that detects a first instruction;
   a designation unit that designates a first pixel region that is displayed in a display region inside the frame of the predetermined area of the image when the first instruction is detected by the first instruction detection unit;
   a second instruction detection unit that detects a recording instruction of the image after the designation by the designation unit;
   a determination unit that, when the recording instruction is detected by the second instruction detection unit, fixes a display position of the frame of the predetermined area on the display screen, and determines whether or not a display region corresponding to the first pixel region included in the image to be successively captured has contacted the frame of the predetermined area of which the display position is fixed, or whether or not the display region corresponding to the first pixel region has gone out of the frame of the predetermined area; and
   a first recording unit that records, when the determination unit determines that the display region corresponding to the first pixel region has contacted the frame of the predetermined area or has gone out of the frame of the predetermined area, an image captured upon the determination and a predetermined number of images to be captured thereafter.

2. The image capture device according to claim 1, further comprising:
   a change detection unit that detects a change of the first pixel region included in the image to be successively captured after the recording instruction is detected by the second instruction detection unit; and
   a second recording unit that records, when the change of the first pixel region is detected by the change detection unit, an image captured upon the detection of the change and a predetermined number of images to be captured thereafter.

3. The image capture device according to claim 1, further comprising:
   a learning unit that learns a size of an area of a region of high likelihood of color information of the first pixel region for an area around the first pixel region from color information of the first pixel region and a predetermined number of image frames to be successively captured after the designation by the designation unit;
   a comparison unit that compares the size of the area of the region of high likelihood learned by the learning unit with a predetermined area; and
   a first wait unit that determines the first pixel region as a pixel region to be tracked by the determination unit and waits for the detection of the recording instruction by the second instruction detection unit in a case in which the size of the area of the region of high likelihood is inside the predetermined area according to the comparison by the comparison unit.

4. The image capture device according to claim 3, further comprising a second wait unit that cancels the designation of the first pixel region by the designation unit and waits for an instruction detection by the first instruction detection unit in a case in which the size of the area of the region of high likelihood is larger than the predetermined area according to the comparison by the comparison unit.

5. The image capture device according to claim 4, further comprising a notification unit that notifies of the cancellation of the designation of the first pixel region by the designation unit in the case in which the size of the area of the region of high likelihood is larger than the predetermined area according to the comparison by the comparison unit.

6. The image capture device according to claim 3, further comprising:
   a change detection unit that detects a change of the first pixel region included in the image to be successively captured after the recording instruction is detected by the second instruction detection unit; and
   a second recording unit that records, when the change of the first pixel region is detected by the change detection unit, an image captured upon the detection of the change and a predetermined number of images to be captured thereafter;
   wherein the change detection unit detects the change of the first pixel region by detecting a change in size of the area of the region of high likelihood learned by the learning unit.

7. The image capture device according to claim 1, further comprising a modification unit that modifies a size of the frame of the predetermined area.

8. The image capture device according to claim 1, further comprising an adjustment unit that performs an adjustment of an exposure value of a central vicinity inside the frame of the predetermined area of the image to be captured when the first instruction is detected by the first instruction detection unit.

9. The image capture device according to claim 1, further comprising:
   a lens; and
   a lens control unit that controls the lens to focus on a central vicinity inside the frame of the predetermined area of the image to be captured when the first instruction is detected by the first instruction detection unit.

10. The image capture device according to claim 1, further comprising:
    a shutter button;
    wherein the first instruction detection unit detects the first instruction upon a half-press operation of the shutter button; and
    wherein the second instruction detection unit detects the recording instruction upon a operation of the shutter button.

11. The image capture device according to claim 1, further comprising a recording start unit that starts recording the image to be captured when the recording instruction is detected by the second instruction detection unit.

12. A non-transitory computer-readable storage medium having stored thereon a program that causes a computer to function as units comprising:
    a display control unit that displays an image to be successively captured and a frame of a predetermined area on a display screen of a display unit, wherein the display control unit displays the frame of the predetermined area so as to be superimposed on the image;
    a first instruction detection unit that detects a first instruction;
    a designation unit that designates a first pixel region that is displayed in a display region inside the frame of the predetermined area of the image when the first instruction is detected by the first instruction detection unit;
    a second instruction detection unit that detects a recording instruction of the image after the designation by the designation unit;
    a determination unit that, when the recording instruction is detected by the second instruction detection unit, fixes a display position of the frame of the predetermined area on the display screen, and determines whether or not a display region corresponding to the first pixel region included in the image to be successively captured has contacted the frame of the predetermined area of which the display position is fixed, or whether or not the display region corresponding to the first pixel region has gone out of the frame of the predetermined area; and
    a first recording unit that records, when the determination unit determines that the display region corresponding to the first pixel region has contacted the frame of the predetermined area or has gone out of the frame of the predetermined area, an image captured upon the determination and a predetermined number of images to be captured thereafter.

13. The non-transitory computer-readable storage medium according to claim 12, wherein the program further causes the computer to function as units comprising:
    a change detection unit that detects a change of the first pixel region included in the image to be successively captured after the recording instruction is detected by the second instruction detection unit; and
    a second recording unit that records, when the change of the first pixel region is detected by the change detection unit, an image captured upon the detection of the change and a predetermined number of images to be captured thereafter.

\* \* \* \* \*